US010614099B2

(12) United States Patent
Eigner et al.

(10) Patent No.: US 10,614,099 B2
(45) Date of Patent: Apr. 7, 2020

(54) HUMAN INTERACTIONS FOR POPULATING USER INFORMATION ON ELECTRONIC FORMS

(71) Applicant: UBIQ Security, Inc., San Diego, CA (US)

(72) Inventors: Linda Eigner, La Jolla, CA (US); William Eigner, La Jolla, CA (US); Eric Tobias, La Jolla, CA (US); Charles Kahle, Escondido, CA (US); Anthony F. Iasi, San Diego, CA (US)

(73) Assignee: UBIQ Security, Inc., San Diego, CA (US)

( * ) Notice: Subject to any disclaimer, the term of this patent is extended or adjusted under 35 U.S.C. 154(b) by 31 days.

(21) Appl. No.: 14/061,743

(22) Filed: Oct. 23, 2013

(65) Prior Publication Data

US 2014/0123057 A1 May 1, 2014

Related U.S. Application Data

(60) Provisional application No. 61/720,305, filed on Oct. 30, 2012, provisional application No. 61/720,309, (Continued)

(51) Int. Cl.
*G06F 16/28* (2019.01)
*G06F 16/00* (2019.01)
(Continued)

(52) U.S. Cl.
CPC .......... *G06F 16/285* (2019.01); *G06F 3/0487* (2013.01); *G06F 16/00* (2019.01);
(Continued)

(58) Field of Classification Search
CPC .... H04L 67/30; H04W 4/08; G06F 17/30598; G06F 21/60; G06F 17/243
(Continued)

(56) References Cited

U.S. PATENT DOCUMENTS 5,367,619 A   11/1994   DiPaolo et al.
5,563,998 A   10/1996   Yaksich et al.
(Continued)

FOREIGN PATENT DOCUMENTS

EP   1522947 A2   4/2005
GB   2514428 A   11/2014
(Continued)

OTHER PUBLICATIONS

Laserfiche, Quick Fields, Extract Value From Your Information, Compulink Management Center, Inc., 2009, 11 pages.
(Continued)

*Primary Examiner* — Ryan F Pitaro
*Assistant Examiner* — Henry Orr
(74) *Attorney, Agent, or Firm* — Scott H. Davison; Musick Davison LLP

(57) ABSTRACT

Systems and methods are provided for populating user information onto an electronic form using human interactions via touch, voice, gestures or an input device. The electronic form is selected by the user for completion using a user profile of stored data. When a form field requires a manual input—such as a form field with multiple potential values—a user is prompted to complete the field using one or more of the human interactions to allow the user to easily complete the field. These human interactions may include touching the form field with a finger on a touchscreen user interface, speaking the form field name, gesturing or selecting via the input device to generate a window of different potential values, and then touching, speaking, gesturing of selecting via the input device the value that the user prefers.

20 Claims, 13 Drawing Sheets

Related U.S. Application Data filed on Oct. 30, 2012, provisional application No. 61/720,907, filed on Oct. 31, 2012, provisional application No. 61/720,916, filed on Oct. 31, 2012, provisional application No. 61/857,177, filed on Jul. 22, 2013.

(51) Int. Cl.

| | | |
|---|---|---|
| G06F 16/335 | (2019.01) | |
| G06F 16/35 | (2019.01) | |
| G06F 16/9535 | (2019.01) | |
| G06F 21/60 | (2013.01) | |
| G06F 17/24 | (2006.01) | |
| G06F 3/0487 | (2013.01) | |
| H04L 29/08 | (2006.01) | |
| H04W 4/08 | (2009.01) | |
| G06Q 30/02 | (2012.01) | |

(52) U.S. Cl.
CPC .......... *G06F 16/337* (2019.01); *G06F 16/355* (2019.01); *G06F 16/9535* (2019.01); *G06F 17/243* (2013.01); *G06F 21/60* (2013.01); *G06Q 30/0204* (2013.01); *G06Q 30/0269* (2013.01); *H04L 67/30* (2013.01); *H04W 4/08* (2013.01)

(58) Field of Classification Search
USPC ........................................................ 715/780
See application file for complete search history.

(56) References Cited

U.S. PATENT DOCUMENTS

| | | | |
|---|---|---|---|
| 5,664,109 A | 9/1997 | Johnson et al. | |
| 5,924,069 A * | 7/1999 | Kowalkowski | G10L 15/26 |
| | | | 704/270 |
| 5,960,080 A * | 9/1999 | Fahlman | G06F 21/6209 |
| | | | 380/252 |
| 6,067,551 A | 5/2000 | Brown | |
| 6,088,700 A | 7/2000 | Larsen et al. | |
| 6,192,380 B1 | 2/2001 | Light | |
| 6,247,029 B1 | 6/2001 | Kelley et al. | |
| 6,651,217 B1 * | 11/2003 | Kennedy | G06F 17/243 |
| | | | 715/224 |
| 6,662,340 B2 * | 12/2003 | Rawat | G06F 17/243 |
| | | | 715/236 |
| 6,681,017 B1 | 1/2004 | Matias et al. | |
| 6,820,204 B1 | 11/2004 | Desai et al. | |
| 6,851,087 B1 | 2/2005 | Sibert | |
| 6,941,291 B1 | 9/2005 | Zoller et al. | |
| 7,092,952 B1 | 8/2006 | Wilens | |
| 7,103,915 B2 | 9/2006 | Redlich | |
| 7,133,937 B2 | 11/2006 | Leavitt | |
| 7,146,644 B2 * | 12/2006 | Redlich | G06F 21/554 |
| | | | 726/27 |
| 7,181,438 B1 | 2/2007 | Szabo | |
| 7,203,699 B2 | 4/2007 | Bellamy | |
| 7,216,292 B1 * | 5/2007 | Snapper | G06F 17/243 |
| | | | 715/234 |
| 7,299,240 B1 | 11/2007 | Crozier | |
| 7,334,184 B1 | 2/2008 | Simons | |
| 7,343,551 B1 | 3/2008 | Bourdev | |
| 7,350,139 B1 | 3/2008 | Simons | |
| 7,500,178 B1 | 3/2009 | O'Donnell | |
| 7,676,526 B1 | 3/2010 | Beloussov | |
| 7,779,345 B2 | 8/2010 | Topalov et al. | |
| 7,810,027 B2 | 10/2010 | Bendik | |
| 7,917,545 B2 | 3/2011 | Mauceri et al. | |
| 7,999,810 B1 * | 8/2011 | Boice | G06T 11/206 |
| | | | 345/473 |
| 8,019,664 B1 | 9/2011 | Tifford et al. | |
| 8,082,144 B1 * | 12/2011 | Brown | G06F 17/243 |
| | | | 379/201.1 |
| 8,099,599 B2 | 1/2012 | Folta | |
| 8,260,806 B2 | 9/2012 | Steele et al. | |
| 8,327,141 B2 | 12/2012 | Vysogorets | |
| 8,386,706 B2 | 2/2013 | Koeppe | |
| 8,407,224 B2 | 3/2013 | Bach | |
| 8,489,643 B1 * | 7/2013 | Rubanovich | G06F 16/957 |
| | | | 707/794 |
| 8,639,920 B2 | 1/2014 | Stack et al. | |
| 8,649,521 B2 | 2/2014 | Grube | |
| 8,661,045 B2 | 2/2014 | Raz et al. | |
| 8,676,683 B1 | 3/2014 | Chheda et al. | |
| 8,782,437 B2 | 7/2014 | Rashkovskiy | |
| 9,087,212 B2 | 7/2015 | Balakrishnan | |
| 9,158,927 B1 | 10/2015 | Franklin | |
| 9,165,160 B1 | 10/2015 | Tidd | |
| 9,268,758 B2 | 2/2016 | Gonser | |
| 9,292,484 B1 * | 3/2016 | Plow | G06F 17/243 |
| 9,455,963 B1 | 9/2016 | Roth | |
| 9,590,989 B2 | 3/2017 | Spagnola | |
| 9,665,638 B2 | 5/2017 | Eigner et al. | |
| 9,672,336 B1 | 6/2017 | Spence | |
| 9,842,097 B2 | 12/2017 | Selig | |
| 9,842,227 B2 | 12/2017 | Eigner et al. | |
| 10,298,556 B2 | 5/2019 | Iasi et al. | |
| 2001/0047381 A1 | 11/2001 | Meno | |
| 2002/0049686 A1 | 4/2002 | Chuang | |
| 2002/0049689 A1 | 4/2002 | Venkatram | |
| 2002/0062342 A1 | 5/2002 | Sidles | |
| 2002/0082997 A1 | 6/2002 | Kobata | |
| 2002/0111888 A1 | 8/2002 | Stanley et al. | |
| 2002/0156846 A1 | 10/2002 | Rawat | |
| 2002/0194062 A1 | 12/2002 | Linde | |
| 2003/0014528 A1 | 1/2003 | Crutcher | |
| 2003/0028792 A1 * | 2/2003 | Plow | G06F 17/243 |
| | | | 713/193 |
| 2003/0130951 A1 | 7/2003 | Chess | |
| 2003/0204602 A1 | 10/2003 | Hudson | |
| 2003/0233316 A1 * | 12/2003 | Hu | G06Q 40/02 |
| | | | 705/38 |
| 2004/0049700 A1 | 3/2004 | Yoshida | |
| 2005/0028082 A1 * | 2/2005 | Topalov | G06F 17/243 |
| | | | 715/224 |
| 2005/0050052 A1 * | 3/2005 | Zimmerman | G06F 9/451 |
| 2005/0071342 A1 * | 3/2005 | Calusinski | G06F 16/24573 |
| 2005/0198563 A1 | 9/2005 | Kristjansson | |
| 2005/0257148 A1 * | 11/2005 | Goodman | G06F 17/243 |
| | | | 715/226 |
| 2006/0023875 A1 | 2/2006 | Graunke | |
| 2006/0168509 A1 * | 7/2006 | Boss | G06F 17/243 |
| | | | 715/226 |
| 2006/0194186 A1 | 8/2006 | Nanda | |
| 2007/0033118 A1 | 2/2007 | Hopkinson | |
| 2007/0061393 A1 * | 3/2007 | Moore | G06F 19/325 |
| | | | 709/201 |
| 2007/0078885 A1 * | 4/2007 | Klein, Jr. | G06F 17/2705 |
| 2007/0113078 A1 | 5/2007 | Witt | |
| 2007/0143261 A1 | 6/2007 | Uppala | |
| 2007/0154018 A1 | 7/2007 | Watanabe | |
| 2007/0198854 A1 | 8/2007 | Suzuki | |
| 2007/0208665 A1 | 9/2007 | Ohara | |
| 2007/0250348 A1 * | 10/2007 | D'Ambrosia | G06F 19/322 |
| | | | 705/3 |
| 2007/0256005 A1 * | 11/2007 | Schneider | G06F 17/2235 |
| 2008/0022012 A1 | 1/2008 | Wang | |
| 2008/0071786 A1 | 3/2008 | Swanburg et al. | |
| 2008/0098226 A1 | 4/2008 | Zokumasui | |
| 2008/0120257 A1 | 5/2008 | Goyal et al. | |
| 2008/0126357 A1 | 5/2008 | Casanova | |
| 2008/0155664 A1 | 6/2008 | Lieber | |
| 2008/0215976 A1 | 9/2008 | Bierner | |
| 2008/0235567 A1 | 9/2008 | Raj | |
| 2009/0006646 A1 | 1/2009 | Duarte | |
| 2009/0006940 A1 | 1/2009 | Hardt | |
| 2009/0030910 A1 | 1/2009 | Bennett et al. | |
| 2009/0161870 A1 | 6/2009 | Rosenberg | |
| 2009/0222412 A1 | 9/2009 | Lee et al. | |
| 2009/0254971 A1 | 10/2009 | Herz | |
| 2009/0327321 A1 | 12/2009 | McCormack et al. | |

(56) References Cited

U.S. PATENT DOCUMENTS

| | | |
|---|---|---|
| 2010/0049774 A1 | 2/2010 | Pathak |
| 2010/0058061 A1 | 3/2010 | Folta |
| 2010/0088269 A1 | 4/2010 | Buller |
| 2010/0125794 A1 | 5/2010 | Hampton |
| 2010/0217684 A1* | 8/2010 | Melcher .............. G06Q 30/0603 705/26.1 |
| 2010/0241518 A1 | 9/2010 | McCann |
| 2010/0245938 A1 | 9/2010 | Coley |
| 2010/0274590 A1 | 10/2010 | Compangano et al. |
| 2010/0293108 A1* | 11/2010 | Gurvitch ................ G06Q 40/04 705/36 R |
| 2011/0066843 A1 | 3/2011 | Newman |
| 2011/0071994 A1 | 3/2011 | Tabrizi |
| 2011/0093471 A1 | 4/2011 | Brockway |
| 2011/0145101 A1 | 6/2011 | Berger et al. |
| 2011/0153588 A1 | 6/2011 | Gartner et al. |
| 2011/0191114 A1 | 8/2011 | Bhagwan et al. |
| 2011/0282941 A1 | 11/2011 | Chan et al. |
| 2011/0289010 A1 | 11/2011 | Rankin, Jr. et al. |
| 2012/0047100 A1* | 2/2012 | Lehner ...................... G06F 8/34 706/46 |
| 2012/0059842 A1 | 3/2012 | Hille-Doering et al. |
| 2012/0066223 A1 | 3/2012 | Schentrup |
| 2012/0203733 A1 | 8/2012 | Zhang |
| 2012/0227096 A1 | 9/2012 | Edwards |
| 2012/0323574 A1* | 12/2012 | Wang ...................... G10L 15/22 704/246 |
| 2012/0331088 A1 | 12/2012 | O'Hare |
| 2013/0067243 A1 | 3/2013 | Tamayo-Rios et al. |
| 2013/0151866 A1 | 6/2013 | Koeppe |
| 2013/0173553 A1 | 7/2013 | Apte |
| 2013/0205189 A1* | 8/2013 | DiPierro ............... G06F 17/243 715/224 |
| 2013/0227352 A1 | 8/2013 | Kumarasamy et al. |
| 2013/0232038 A1 | 9/2013 | Murray |
| 2013/0290648 A1 | 10/2013 | Shao |
| 2013/0318347 A1 | 11/2013 | Moffat |
| 2013/0326117 A1 | 12/2013 | Aune |
| 2013/0332804 A1* | 12/2013 | Seaman ................ G06F 17/243 715/201 |
| 2014/0032228 A1 | 1/2014 | Johri |
| 2014/0082073 A1* | 3/2014 | Wable ................... H04L 67/306 709/204 |
| 2014/0122988 A1 | 5/2014 | Eigner |
| 2014/0123057 A1* | 5/2014 | Eigner .................... H04L 67/30 715/780 |
| 2014/0149470 A1 | 5/2014 | Rawal |
| 2014/0173282 A1 | 6/2014 | Pascariello et al. |
| 2014/0201520 A1 | 7/2014 | Yacobi |
| 2014/0201824 A1 | 7/2014 | Agbabian |
| 2014/0223575 A1 | 8/2014 | Nandi et al. |
| 2014/0244317 A1* | 8/2014 | Roberts .................. G06Q 40/08 705/4 |
| 2014/0250534 A1 | 9/2014 | Flores |
| 2014/0279286 A1* | 9/2014 | Ganesh .................. G06Q 30/06 705/27.1 |
| 2014/0279893 A1 | 9/2014 | Branton |
| 2014/0310525 A1 | 10/2014 | Kohlenberg et al. |
| 2014/0331060 A1 | 11/2014 | Hayton |
| 2015/0052354 A1 | 2/2015 | Purohit |
| 2015/0121063 A1 | 4/2015 | Maller et al. |
| 2015/0123057 A1 | 5/2015 | Ogden |
| 2015/0213195 A1 | 7/2015 | Bleechman |
| 2015/0244693 A1 | 8/2015 | Pate |
| 2015/0294118 A1 | 10/2015 | Parker et al. |
| 2015/0371052 A1 | 12/2015 | Lepeshenkov et al. |
| 2015/0371226 A1 | 12/2015 | Hurley et al. |
| 2016/0085996 A1 | 3/2016 | Eigner et al. |
| 2016/0173605 A1 | 6/2016 | Iasi et al. |
| 2016/0211976 A1 | 7/2016 | Paris et al. |
| 2017/0102898 A1 | 4/2017 | Shimizu |
| 2017/0163419 A1 | 6/2017 | Stuntebeck et al. |
| 2017/0208050 A1 | 7/2017 | Iasi et al. |
| 2017/0208052 A1 | 7/2017 | Jai |
| 2017/0250807 A1 | 8/2017 | Brannon |
| 2017/0359717 A1 | 12/2017 | Adler et al. |
| 2018/0091538 A1 | 3/2018 | Narayanan et al. |
| 2018/0176017 A1 | 6/2018 | Rodriguez et al. |
| 2018/0181964 A1 | 6/2018 | Zagarese et al. |

FOREIGN PATENT DOCUMENTS

| | | |
|---|---|---|
| JP | 2008139996 A | 6/2008 |
| KR | 1020110139798 A | 12/2011 |
| KR | 1020130108679 A | 10/2013 |
| KR | 101441581 B1 | 9/2014 |
| KR | 101520722 A | 5/2015 |
| KR | 10-2017-0085020 A | 7/2017 |
| KR | 10-2017-0110420 A | 10/2017 |
| WO | 2001006416 A1 | 1/2001 |
| WO | 2006081122 A2 | 8/2006 |
| WO | 2007085824 A2 | 8/2007 |
| WO | 2008065342 A1 | 6/2008 |
| WO | 2013127877 A1 | 9/2013 |
| WO | 2013149178 A2 | 10/2013 |

OTHER PUBLICATIONS

Bownik, Assited Form Filing, www.intechopen.com, pp. 41-65, Oct. 1, 2009 (26 pages).
Extended European Search for EP Application No. 13850795.9 dated May 24, 2016, (7 pages).
PCT International Search Report and Written Opinion from corresponding application PCT/US2013/067610 dated Feb. 26, 2014 (16 pages).
PCT IRPR from corresponding application PCT/US2013/067610 dated May 5, 2015 (12 pages).
PCT International Search Report from corresponding application PCT/US2017/037328 dated Sep. 21, 2017 (3 pages).
PCT Written Opinion/IRPR from corresponding application PCT/US2017/037328 dated Dec. 18, 2018 (18 pages).
PCT International Search Report from corresponding application PCT/US2018/037388 dated Jan. 16, 2019 (5 pages).
PCT Written Opinion from corresponding application PCT/US2018/037388 dated Jan. 16, 2019 (7 pages).
PCT International Search Report and Written Opinion from corresponding application PCT/US2015/041210 dated Oct. 30, 2015 (11 pages).
PCT International Search Report and Written Opinion from corresponding application PCT/US2015/051782, dated Jan. 4, 2016 (14 pages).
PCT International Search Report from corresponding application PCT/US2015/065911, dated Mar. 30, 2016 (14 pages).
PCT International Search Report from corresponding application PCT/US2017/014451, dated Apr. 17, 2017 (8 pages).
PCT IRPR from related application PCT/US2017/014451 dated Aug. 2, 2018 (7 pages).
PCT Written Opinion from corresponding application PCT/US2018/054235 dated Feb. 26, 2019 (12 pages).
PCT Written Opinion from corresponding application PCT/US2019/021438 dated Jun. 20, 2019 (11 pages).
PCT Written Opinion from corresponding application PCT/US2019/021440 dated Jun. 21, 2019 (10 pages).
PCT Written Opinion from corresponding application PCT/US2019/021453 dated Jun. 26, 2019 (12 pages).
PCT International Search Report and Written Opinion from corresponding application PCT/US2019/021462 dated Jun. 17, 2019 (12 pages).
Extended EP Search for EP Application No. 15844963.7, dated Apr. 10, 2018 (7 pages).
Extended EP Search for EP Application No. 15780918.8, dated Aug. 17, 2018 (18 pages).
Supplementary EP Search for EP Application No. 15870918.8 dated May 11, 2018 (17 pages).
Amihai Motro and Francesco Parisi-Presicce, "Blind Custodians: A Database Service Architecture That Supports Privacy Without Encryption," Data and Applications Security XIX, copyright 2005, pp. 338-352.

(56) References Cited

OTHER PUBLICATIONS

Extended EP Search for EP Application No. 17813970.5 dated Nov. 4, 2019 (8 pages).
https://github.com/kohana/cascading-filesystem (Year: 2015) (4 pages).

* cited by examiner

| customerFieldDefaults_id | customer_id | customerFieldItems_id | customerFieldCollections_id | fieldName | fieldValue |
|---|---|---|---|---|---|
| 647 | 17 | NULL | NULL | Prev_LName | Smith |
| 648 | 17 | NULL | NULL | PhoneNumber | 333-333-3322 |
| 649 | 17 | NULL | NULL | Email | me@me.com |
| 650 | 17 | NULL | NULL | Address | 123 Main St |
| 651 | 17 | NULL | NULL | Country | US |
| 652 | 17 | NULL | NULL | Email Address | me@me.com |
| 653 | 17 | NULL | NULL | Last Name | Iao |
| 654 | 17 | NULL | NULL | First Name | Anthony |

Check All / Uncheck All  With selected: ✓ ✗ 🗑

FIG. 7

| document_id | documentCategory_id | documentTitle | pathOnServer | fields_id | revisionCode | format | revisionSKU |
|---|---|---|---|---|---|---|---|
| 82 | 1 | Tutti Frutti Employment Application | documentfiles/Tutti_Frutti_mods.pdf | NULL | NULL | NULL | 10001000 |
| 91 | 4 | Health Information Form for Adults | documentfiles/PHR-AdultsPDF_mods.pdf | NULL | NULL | NULL | 4001000 |
| 92 | 2 | FL150 Income and Expense Declaration | documentfiles/fl150_mods.pdf | NULL | NULL | NULL | 10001200 |
| 135 | 7 | UDALL Scholarship Application | documentfiles/SampleUdallScholarshipApplication_mo... | NULL | NULL | NULL | 15001000 |
| 136 | 7 | Sample Art Scholarship ArtStudy.org | documentfiles/SampleArtScholarship_mods.pdf | NULL | NULL | NULL | 15001000 |

Check All / Uncheck All  With selected: ✓ ✗ 🗑

| fields_id | fieldProperties_id | document_id | fieldName | fieldValue (Default value if present) | pageNumInPdf | fieldType | descriptionInPdf | commonFieldName | fieldSectionCategory |
|---|---|---|---|---|---|---|---|---|---|
| 3044 | NULL | 91 | Height | | 1 | | | Height | identification |
| 3045 | NULL | 91 | Weight | | 1 | | | Weight | identification |
| 3046 | NULL | 91 | Eye Color | | 1 | | | Eye Color | identification |
| 3047 | NULL | 91 | Hair Color | | 1 | | | Hair Color | identification |
| 3048 | NULL | 91 | Ethnicity_Race | | 1 | | | Ethnicity_Race | identification |
| 3049 | NULL | 91 | Birthmarks_Scars | | 1 | | | Birthmarks_Scars | identification |
| 3050 | NULL | 91 | Blood RH Type | | 1 | | | Blood RH Type | identification |
| 3051 | NULL | 91 | Special Conditions | | 1 | | | Special Conditions | identification |
| 3052 | NULL | 91 | Marital Status | | 1 | | | Marital Status | identification |
| 3053 | NULL | 91 | Occupation | | 1 | | | Occupation | identification |
| 3054 | NULL | 91 | Company Name | | 1 | | | Company Name | identification |
| 3055 | NULL | 91 | Company Address | | 1 | | | Company Address | identification |

| customerFieldDefaults_id | customer_id | customerFamMem_id | customerFieldVariants_id | customerFieldCollections_id (such as groceries by goes to the zoo) | fieldName | fieldValue |
|---|---|---|---|---|---|---|
| ✗ 649 | 17 | NULL | NULL | NULL | Email | me@me.com |
| ✗ 650 | 17 | NULL | NULL | NULL | Address | 123 Main St |
| ✗ 651 | 17 | NULL | NULL | NULL | Country | US |
| ✗ 652 | 17 | NULL | NULL | NULL | Email Address | me@me.com |
| ✓ 653 | 17 | NULL | NULL | NULL | Last Name | last |
| ✗ 654 | 17 | NULL | NULL | NULL | First Name | Anthony |
| ✗ 655 | 7 | NULL | NULL | NULL | bstreet | 333 Billing St |
| ✗ 656 | 7 | NULL | NULL | NULL | bcity | San Diego |
| ✗ 657 | 7 | NULL | NULL | NULL | bstate | CA |
| ✗ 658 | 7 | NULL | NULL | NULL | bzip | 92101 |
| ✗ 659 | 7 | NULL | NULL | NULL | billing | 33 digit Harvard Billing Code |
| ✗ 660 | 7 | NULL | NULL | NULL | digit | 7474999871111111458705437094 |

Check All / Uncheck All With selected: ✏ 🗑

1100

1102 (fieldName column)
1104 (fieldValue column)

FIG. 11

HUMAN INTERACTIONS FOR POPULATING USER INFORMATION ON ELECTRONIC FORMS

BACKGROUND

1. Field of the Invention

Various embodiments described herein relate generally to the field of electronic management of information, and more particularly to human interactions for populating user information on an electronic form, document or webpage.

2. Related Art

The vision of a paperless modern society is quickly becoming a reality, as more and more communications, services and transactions take place digitally across networks such as the Internet. The need for paper copies of correspondence, financial documents, receipts, contracts and other legal instruments is dwindling as electronic methods for securely transmitting, updating and accessing these documents increases. In addition to the electronic transmission and access to documents and correspondence, the process of electronically submitting information is also commonplace, such as with online shopping or applications for loans, credit cards, health insurance, college or job applications, etc.

However, much of the information required in these forms is common to other forms, and yet users manually repeat populating the form inputs with the same information over and over again. The ability to collect, organize, update, utilize and reapply the input information required in these electronic documents, forms and applications remains highly difficult. While some applications have been developed to store certain basic information about a user—such as the user's name, address and financial information—the ability to organize, access and apply this stored information for additional online activities remains very limited, especially when detailed input information and/or computations are required to complete forms such as college applications and family law declarations.

There are several programs or applications that allow a user to track financial information, budget, forecast, balance spending accounts, etc. While these tools can save time and provide effective tools for budgeting etc., they do not address the numerous circumstances in which a user is required to provide personal information, financial information, forecasts, categorized expenditures, etc., in a specific format or in accordance with specific forms, etc.

For example, when someone gets divorced, they must provide the court with detailed personal and financial information, both of past records as well as projected needs. This information has to be provided in a very specific state-mandated format using a specific form and it must be updated and submitted to the court at various points during the divorce process, which may last over a long period of time. For example, FIG. 1 illustrates one page of an Income and Expense Declaration that both petitioner and respondent must fill out in a California divorce proceeding. The amount and complexity of the information needed for a form such as this typically requires the person completing the form—such as the party to the divorce or an attorney—to spend a significant amount of time obtaining all of the needed information and even performing calculations of information to obtain the desired values. As another example, when a user wishes to get a loan, such as a car loan or mortgage, the organization providing the loan will often require the user to provide and update certain financial records and information organized in a certain format.

Even well-organized, financially savvy users using currently available personal financial software tools find completing and updating these forms to be burdensome, time-consuming, confusing, and susceptible to mistake. The applicable forms and other applicable items require much more than basic financial information. Additionally, there is a significant need to accurately complete these forms, as the forms can obviously have a significant impact on whether the applicant qualifies for financial aid, a loan, etc., or receives a favorable outcome in a divorce or other legal proceeding.

These same challenges apply to other critical life events, such as applying to, and/or paying for college. The college application process is a high anxiety time for students and very often, their parents. There is a lot of detailed information required to complete college and financial aid applications, including but not limited to essays, transcripts, letters of recommendation, activities, photos, etc. Also, college applications and financial aid opportunities have many different deadlines. It is very difficult to stay organized and keep on top of all the information, deadlines and applications submitted.

SUMMARY

Disclosed herein are systems and methods for populating user information onto an electronic form using human interactions via touch, voice, gestures or an input device. The electronic form may be a word processing document, image file, template, application-specific form or web page selected by the user for completion from a user profile of user data. When a form field requires a manual input—such as a form field with multiple potential values—a user is prompted to complete the field using one or more of the human interactions to allow the user to easily complete the field without needing to type in the value with a keyboard. These human interactions may include touching the form field with a finger on a touchscreen user interface to generate a window of different potential values and then speaking the value that the user prefers, or speaking the name of the form field and then selecting a value via touch from the window of different potential values that appears. Gestures could also be accepted to select a certain form field and field value on a device with gesture recognition, while an input device such as a mouse or stylus may be utilized to perform certain selections.

In one aspect of the invention, a system for populating user information on an electronic form comprises: an information populating unit which is configured to: identify at least one field on the electronic form which requires manual user input; receive a first user input selecting the at least one identified field; receive a second user input selecting a value for the at least one identified field; and populate the selected value into the identified field of the electronic form.

In another aspect of the invention, a method of populating user information on an electronic form comprises the steps of: identifying at least one field on the electronic form which requires manual user input; receiving a first user input selecting the at least one identified field; receiving a second user input selecting a value for the at least one identified field; and populating the selected value into the identified field of the electronic form.

Other features and advantages should become apparent from the following description of the preferred embodiments, taken in conjunction with the accompanying drawings.

BRIEF DESCRIPTION OF THE DRAWINGS

Various embodiments disclosed herein are described in detail with reference to the following figures. The drawings are provided for purposes of illustration only and merely depict typical or exemplary embodiments. These drawings are provided to facilitate the reader's understanding and shall not be considered limiting of the breadth, scope, or applicability of the embodiments. It should be noted that for clarity and ease of illustration these drawings are not necessarily made to scale.

FIG. 1 is an image of an Income and Expense Declaration form used in a divorce proceeding.

FIG. 6 is an image of a database table listing field identifying numbers, field names and field values, according to one embodiment.

FIG. 7 is an image of a database table of forms which are stored in the system for automatic completion, according to one embodiment.

FIG. 8 is an image of a database table which lists field names and field values on each form document stored in the system, according to one embodiment.

FIG. 10A illustrates a graphical user interface of a form with a unique field name that can be automatically identified, stored in the system database, according to one embodiment.

FIG. 11 is an image of a database table which stores a field identifier, field name and field value for the unique field in the form illustrated in FIGS. 10A and 10B, according to one embodiment.

Figure 2:
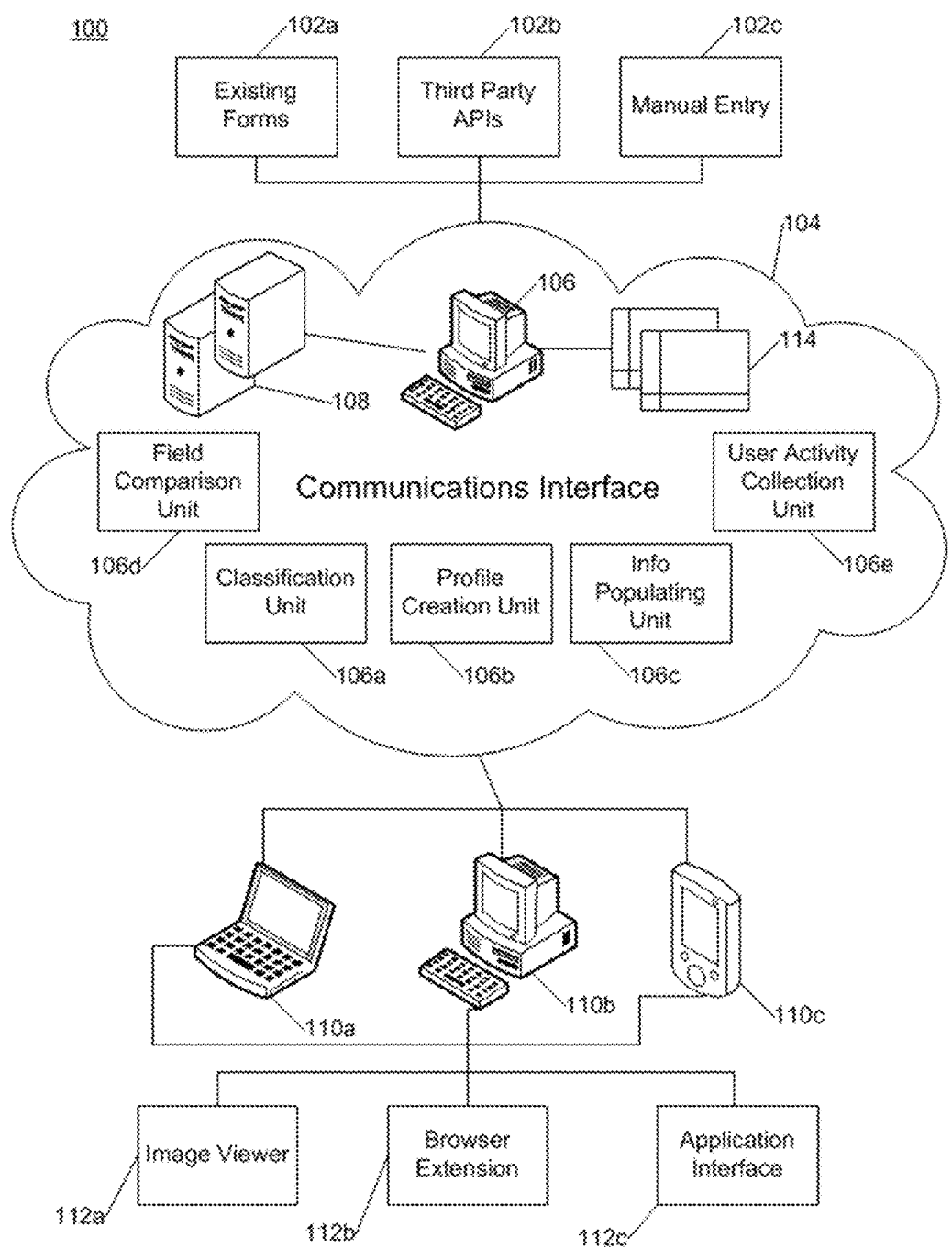
FIG. 2 is a block diagram illustrating a system for obtaining, classifying and populating personal information on electronic forms, according to one embodiment.

The various embodiments mentioned above are described in further detail with reference to the aforementioned figured and the following detailed description of exemplary embodiments.

DETAILED DESCRIPTION

The embodiments described herein provide for the collection, organization and use of information for automatically completing, updating and submitting complex electronic documents and online forms, such as online shopping checkout forms; applications for loans, credit cards, health insurance, college or jobs; government-mandated documents required for legal proceedings (such as divorce or bankruptcy); and forms required for or by businesses and business owners. Information is obtained from a plurality of different sources and classified through field mapping and other information classification techniques to build an organized database of information related to a user known as an information vault. The information is securely stored via encryption and disassociation techniques in one or more user databases to ensure the security of the information. A forms database is utilized for storing electronic forms and documents as well as the field information needed to complete the form or document. The user can access their information to automatically populate the fields of an online form or an electronic document by selecting a document from the forms database or by utilizing a browser plug-in to populate an online form being displayed in a web browser. The system may also be integrated with third party services and websites to populate information on the third party site via secure connections to the user databases, while allowing the user to retain the information in our highly secure database.

The techniques described herein provide for the ability to quickly and accurately complete, update and submit any type of form on any type of computing device, as the user database builds a profile of the user that includes, for example, identification information, financial information, health information, contact information and historical user information that is classified with high accuracy to ensure that a form is populated with the correct information. The user retains full control of any downloading, transmission, editing or deleting of their information and only needs to enter and verify their information once rather than repeat the same process over and over again.

The systems and methods described herein may be utilized by individuals, groups, entities, governments or businesses for various types of information collection, management and entry. Individual users may populate online forms on their desktop, tablet, smartphone, etc., and be able to instantly complete the form. In one embodiment, the system may be offered as a mobile application running on a smartphone, tablet or other portable electronic device that would enable a user to complete forms or other documents. With the difficulty of inputting information using small display screens and touchscreen devices, the ability to easily populate information with a portable electronic device is particularly advantageous. Businesses may organize and store information to complete forms such as human resource forms, building permit forms, elevator license forms in various jurisdictions, etc. Although the examples provided herein relate primarily to the use of the systems and methods for individual users, the benefits and applications also extend to groups of users, entities, governments or businesses of any size and type.

This solution is unique because once users enter their information once, the information is stored in their information vault, after which they can use it forever for supplying information or completing any forms that require the same repeat information. Non-limiting examples include new patient forms for health care, college admissions applications, scholarship applications, financial aid applications, loan applications, medical questionnaires, job applications, insurance forms, legal declaration or proceeding documents, government benefit or service requests, personal health records, ecommerce checkout forms, membership applications, etc.

FIG. 2 illustrates one embodiment of a system 100 for obtaining, classifying and populating information onto electronic forms, in accordance with one embodiment of the invention. Information is obtained from one or more information sources 102a-c, such as existing forms 102a, third party application interfaces 102b or manual user entry 102c. The information is then transmitted to a communications interface 104, where it is then classified by a server 106 and stored in one or more databases 108 as a user profile of the user's information. The communications interface 104 may be in a local area network (LAN) with the information sources 102 or at a remote location from the information sources 102 through connection via the Internet or other wide area network (WAN). The communications interface 104 will also include one or more information processing units within the server 106 to process the collected information, including a classification unit 106a which classifies the information to identify fields applicable to the information and values for the fields; a profile creation unit 106b which creates a user profile with the classified information; and an information populating unit 106c which populates at least one form field of an electronic form or database by matching the at least one form field with the classified information. A field comparison unit 106d and a user activity collection unit 106e may also be included, the functions of which will be described further below. Any of the aforementioned units may be located within separate servers or within a single server, depending on the design of the overall system. The user, through any type of device 110a-c, may then request that one or more forms 112 be completed using the information in their profile. Any type of device may be utilized by the user, including a laptop computer 110a, desktop computer 110b, or a portable electronic device 110c such as a tablet or smartphone. The user can interact with the communications interface 104 through the device 110 to complete one or more forms 112a-c, such as an image viewer 112a, a form displayed in an internet-browser application 112b, or a form displayed via an application 112c running on the portable electronic device 110c. Forms may also be displayed directly in a browser window via HTML5-CSS3 or via an application 112c interfacing with the server 106 through one or more graphical user interfaces (GUIs) 114 produced by the server 106 that are displayed on the device 110c. As demonstrated herein, the forms may be populated directly on the user's device, through a browser extension, add-on browser application, or via an application programming interface (API) interacting with a third party service or application.

Figure 3:
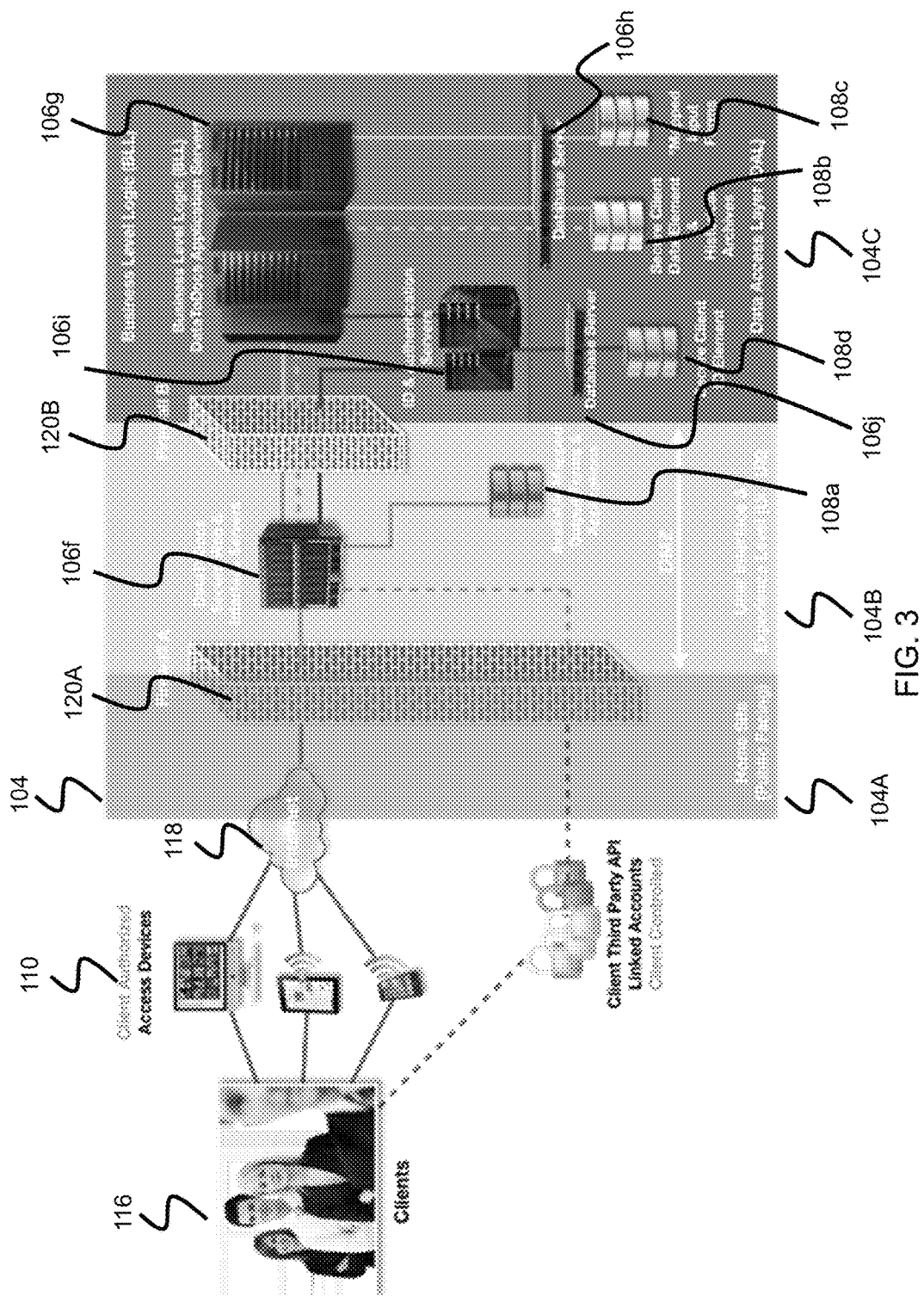
FIG. 3 is a diagram further illustrating the system for obtaining, classifying and populating personal information on electronic forms, according to one embodiment.

FIG. 3 is an illustration of a system diagram illustrating the security protocol of one configuration of the system. Users 116 can access the system via the various devices 110 described above, which are connected with the communications interface 104 via the Internet 118. Multiple servers and databases may be utilized and separated between various firewalls for increased protection of the user profile information to ensure privacy and security. Users may initially be presented with a GUI showing basic information that is considered the public-facing home site 104a of the communication interface 104 which is also protected by an initial firewall 120a. The initial firewall 120a provides overall security for the system and allows access to the user interface and experience level (UI/UX) 104b of the interface. The UI/UX 104b includes a web and interface server 106f connected with a forms and applications output database 108a. A second firewall 120b protects a third section of the communications interface known as the data access layer 104c. The data access layer 104c includes business level logic application servers 106g connected with a database server 106h which manages a secure client data element and historical archives database 108b and a mapped input forms database 108c. Separate ID and authentication servers 106i are also enclosed within the data access layer 104c, which are connected with an identification database server 106j which manages a secure client ID element database 108d.

Figure 4:
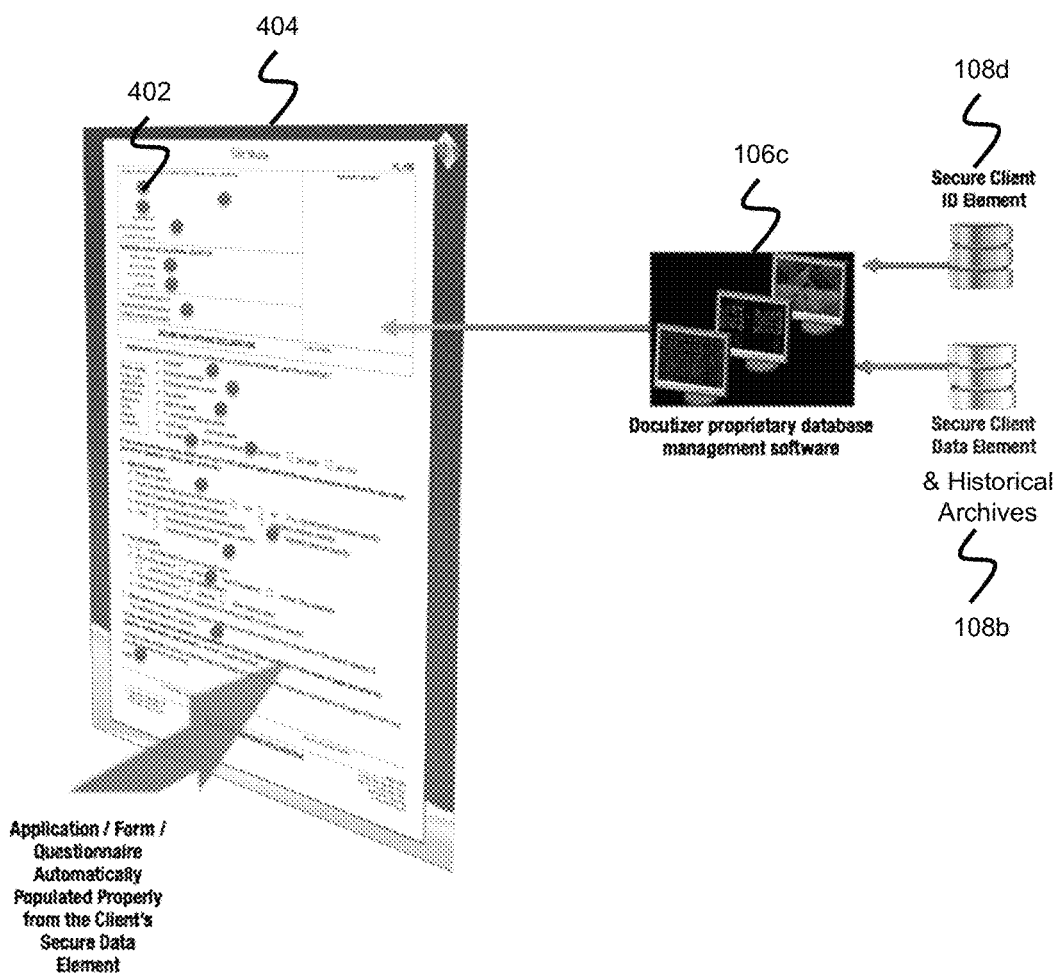
FIG. 4 is an illustration of the system involved in pre-populating fields of a document, according to one embodiment.

FIG. 4 illustrates one embodiment of the steps of populating fields 402 of a form 404 by accessing information stored in the secure client ID element database 108d and the secure client data element database 108b through database management software such as the information populating unit 106c the system components involved in populating an electronic form, where a separate client identification database and client information database are utilized by software at the system server to obtain the information needed to populate an electronic form.

Details of the systems and methods are provided further herein with regard to the specific components and features.

I. Collecting Information and Forms

Information may be obtained from multiple different sources and in multiple different formats in order to obtain a complete set of information for a user. For example, the user information may be obtained by having the user complete a "master form" specifically designed to collect information that many of the forms require in a variety of categories (i.e., loan applications, online shopping, college applications, divorce proceedings, etc.). The user information may also be collected from existing electronic or non-electronic records, such as financial institution databases, electronic health records, third party information aggregation services (such as Mint.com®), or by the user following simple instructions in the system's web-based user interface. The user may need to grant access to one or more of these existing electronic records so that the relevant information can be obtained, and the system may utilize specific Application Programming Interfaces (APIs) to communicate with the third party sites to obtain field and content information. For existing electronic records, it is likely that the information is already classified within a database with specific field names or identifications such that substantial additional classification of the information is not needed; however, due to the complexity of many of the forms such as divorce filings and financial schedules, the database is able to overlay additional computations and reorganize the classifications so that they match the required output of the forms. For non-electronic records, the user may be able to scan or take a picture of the non-electronic document and have the fields and field values extracted through various technologies such as image processing and content extraction software, as is known to one of skill in the art.

Figure 5:
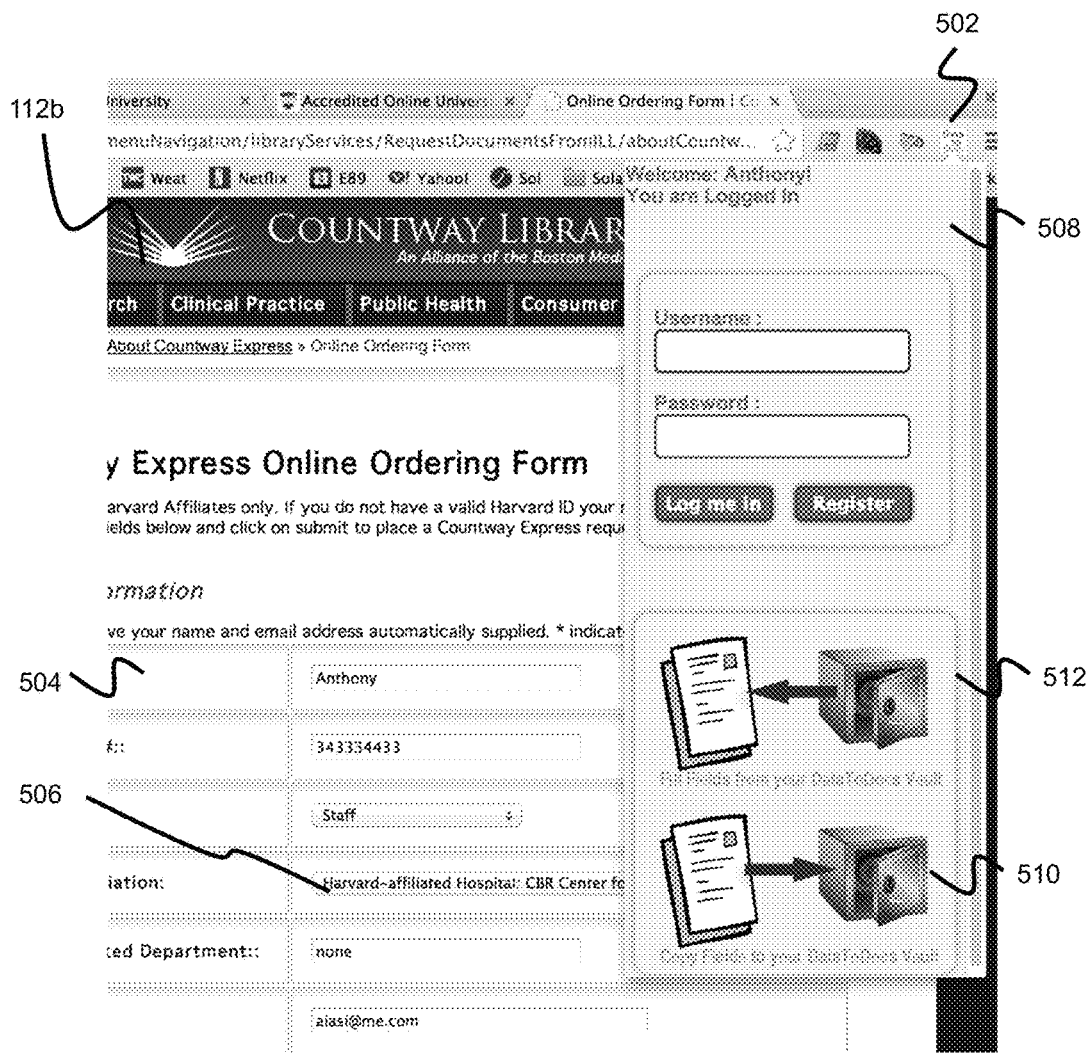
FIG. 5 is a screen shot of a graphical user interface illustrating a browser extension for implementing the inventive system, according to one embodiment.

In one embodiment, the information may be obtained when a user manually completes an electronic form or document. For example, as illustrated in FIG. 5, if the user completes a form 112b displayed on an internet-browser application, the application may include a browser extension 502 to allow for the form 112b, fields 504 and content 506 of the fields to be captured, extracted, organized, classified and uploaded to the user's database for future use on the same or other forms. The browser extension 502 may provide a popup menu 508 with a Copy Button 510 to copy fields to the user profile, as well as a Fill Fields Button 512 to populate data from the user profile to the form 112b. The information may be extracted and populated even for a complete form that spans numerous pages. Blank forms and documents and other user information may also be directly uploaded to the system, where the form or document and its fields can be captured, mapped and stored as templates. For example, a credit card application form may be uploaded to the system and stored in the Document Library Database, with the form fields identified so they can be mapped to the corresponding user fields in the database, either manually or using automatic mapping techniques.

Completed forms and documents may also be directly uploaded to the system, where the form or document, the fields and content of the fields can be captured and extracted. For example, a credit card statement or a mortgage statement may be uploaded to the system, where the fields and content in the fields can be extracted and stored in the user database, although the document itself may not be since it is not a form. However, if a credit card application or a mortgage application is uploaded the document itself may be extracted and stored in addition to the fields and content to help the user and other users fill out the forms in the future.

Figure 1:
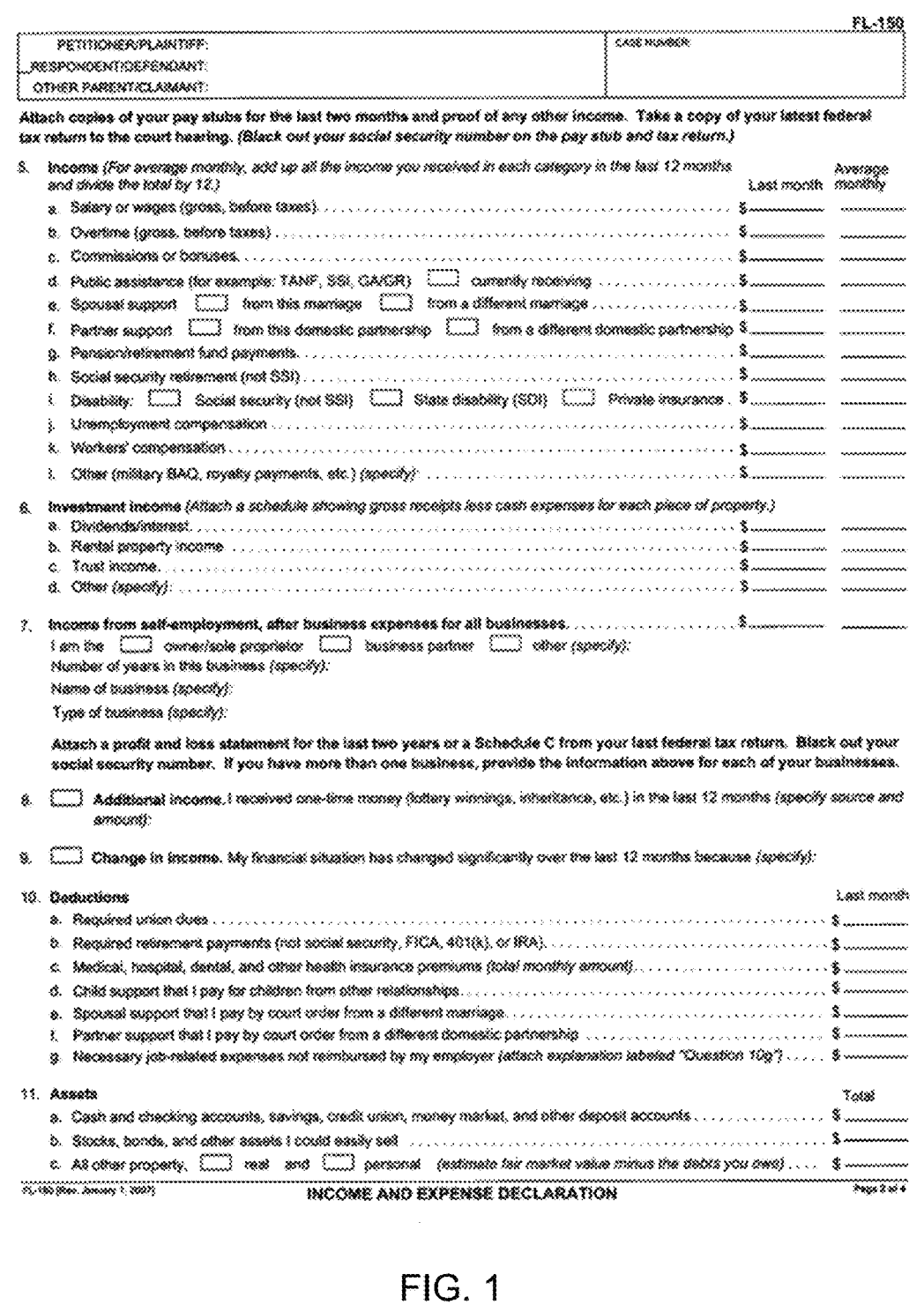

FIG. 6 illustrates one embodiment of a database table 602 with the field information that is collected from a form that is input into the system. As information is sent from the form being worked on to the server, it gets stored in this table. When information is "pulled" from the server and applied to forms, it comes out of this table. The form may be a form such as that illustrated in FIG. 1 and may have been completed by the user such that the form fields have values already entered. As shown in FIG. 6, each field 604 on the form is provided a unique numerical identifier 606 (customerFieldDefaults_Id) to distinguish it from other fields. As shown in the right two columns, each field is also given a field name 608 (fieldName) and field value 610 (fieldValue). The field name may be the name encoded on the form itself which can be extracted from the form if it is on a website or an electronic form with field name metadata that has already identified the field name based on the programmer that created the original form. The field value (if available) will obviously correspond to the content of the field. The associations between field names and field values (known as name-value pairs) are important for classifying content and building the user profile.

FIG. 7 illustrates a document library table 702 which stores a list of documents 704 that are stored in the system. The documents each are provided a document identification 706 (document_id), document title 708, and path 710 to the document in an associated database. FIG. 8 illustrates a database table 802 which stores the field names 804 of each document in the Document Library Table of FIG. 7. Note that there is an option to set a default value for each field. For example, this year's tax form may have a default filing year of 2013. The commonFieldName 806 is a human-readable version of fieldName 804 in the cases where fieldName is obscure or poorly named by the original form designer. commonFieldName 806 allows the system to quickly match the field with field names found in a typical customer's vault. The commonFieldName 806 provides for more simple mapping of fields with field names found in a user profile.

Figure 10A:
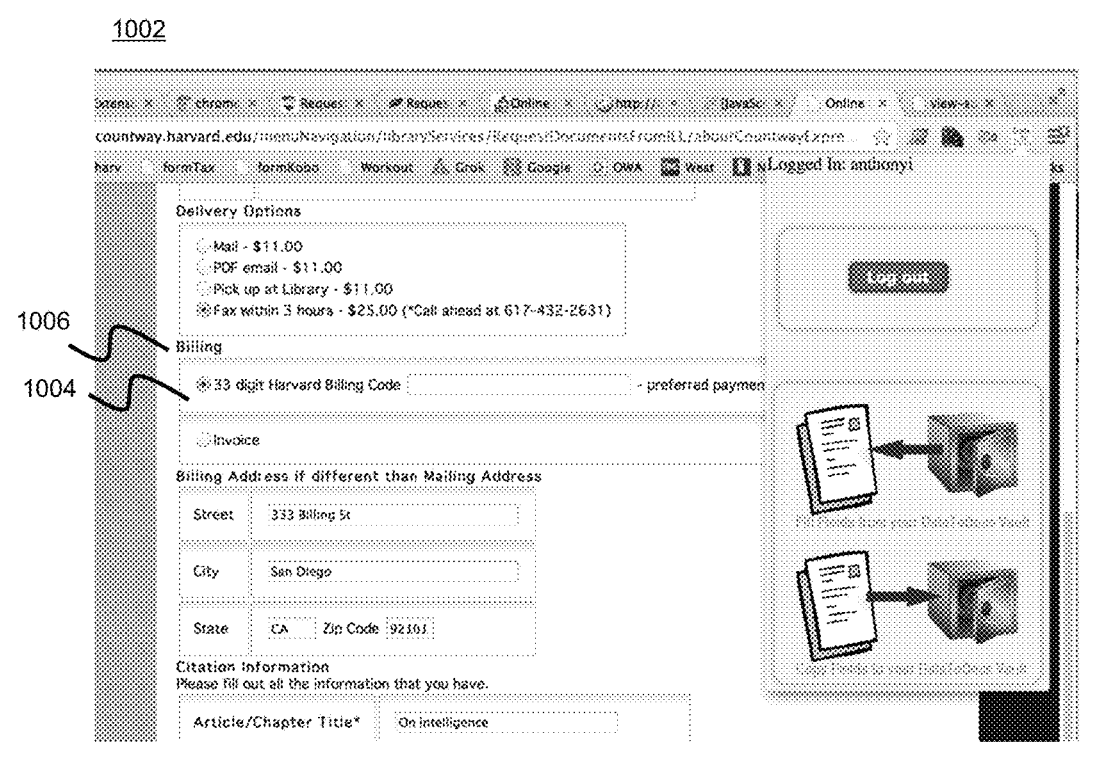
Figure 10B:
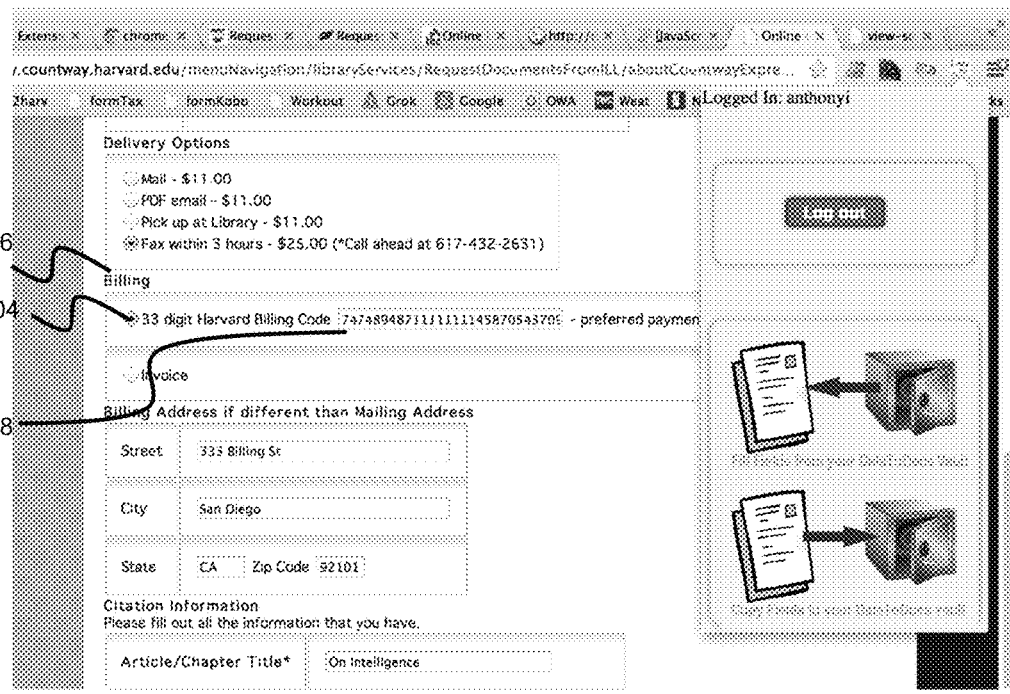
FIG. 10B illustrates a graphical user interface of the form of FIG. 10A with a value of the unique field stored in the system database populated into the field, according to one embodiment.

Unique field names and values are stored and organized in the system for future use. FIGS. 10A and 10B are illustrations of an online form 1002 with a unique billing code field 1004 in the "Billing" section 1006 which requires the field value to be a unique 33 digit code. If the user has not previously entered the code into the system (which is unlikely given that it is a unique code for a particular form), the user will be required to manually enter the field value 1008 in the field 1004 when completing the form 1002 for the first time, as shown in FIG. 10B. The system will pull the information on the field 1004 (and the value 1008 entered by the user in that field) into the system and list them in a database table 1100, as illustrated by the table in FIG. 11. As shown in FIG. 11, there are two entries created for this field, as one corresponds to the field name 1102 (digit) and one corresponds to the field value 1104 (the 33 digit number). In one embodiment, an additional line entry (not shown) is created to associate the radio button next to the field with the field and the field value. This will be useful when the form is being populated in the future, as the system will know to activate/select the radio button when filling in the field value.

In another embodiment, third party services and websites may provide information about forms and documents hosted on their own sites for storage on the system, such as the field names and other document or form-identifying information. Thus, if the user is utilizing the third party service and needs to complete a form or document of the third party service, the user can request that the third party service obtain the user's information from the user database for populating into the form or document at the third party site. The third party service can then maintain their customized form or document on their website or application, and the user can ensure that the content populated into the form or document accurately corresponds to the content needed for each field since the third-party service provided the field information to the system. Additionally, users are provided with additional security of the information, as the information is stored on the system database rather than the third party service's database, reducing the chance that the information could be stolen from the third party service or site.

In another embodiment, the third-party service may integrate the embodied system within their website or application so that information stored in the application or at a third-party server is shared with the system and utilized to complete forms and other documents. Similarly, the integration may provide for sharing of the user's information with the third-party site or application for completion of forms or documents at the third-party site.

Other sources of information may be used or envisioned, as would be apparent to one of skill in the art. As will be described further below, the information sources are used to build a profile of each user by collecting information of the user from the various sources and compiling the information into an organized list of information that can be used to populate fields or supplement information of any type and on any form.

II. Organizing and Storing Information

The information obtained from the various information sources discussed above is used to build a user profile of an individual user which ideally includes comprehensive information on the user's finances, contact information, health information and historical information. The user profile may include the user's name, birth date, age, current and past addresses, phone numbers, e-mail addresses, social security or government identification number, employment information (current and historical), salary, height, weight, race, bank account numbers, account balances, user names, passwords, education information, health risks, allergies, medications, etc. This list is by no means comprehensive. The user profile may also include information not directly related to the user, such as a name and phone number of an emergency contact person, family names and relationships, service provider contact information and notes, business contact information, business prospects, CRM, etc.

Access to the system may be provided by an application interface through software running on a computing device such as a desktop or laptop, or through an application running on a portable electronic device such as a tablet or smartphone. Additionally, the system may be accessible over a web-based application interface, where all of the user's information is securely stored in a secure server facility in a cloud-based network.

In one embodiment, the information may be stored in at least two or three separate databases that are purposely decoupled in order to provide enhanced security by minimizing the risk of hacking into one of the databases. The databases may be divided into a Document Library Database which stores form and document templates, field information and other form properties; a Customer Personal Vault Database which stores the information that includes the fields and field values for each specific user; a User Identity Database which stores information relating to the user's identity (separately from other information for security reasons) and a Customer Orders and Completed Documents Database that stores previously-completed forms in terms of the fields and values that were completed.

As will be described immediately below, the information will likely be classified into distinct categories so that it can be accurately populated or supplemented into an appropriate field of a form. Furthermore, as will also be described below, the potential risk of theft of such a wealth of personal information is mitigated by specialized proprietary encryption and storage techniques to prevent the information from being stolen or from being useful even if it is stolen.

Field Mapping

Identifying which information belongs in which fields within a form is one of the most difficult challenges for populating forms. While many information fields contain names which easily and readily identify the value that belongs in that particular field, some names are ambiguously named, some fields have slightly differing names between different forms, some fields have identical names within the same document, and some fields have multiple values associated with the same field.

There are at least three primary circumstances where information needs to be filled in that drive the following field mapping techniques. In a first circumstance, a document library stores standard document templates which may be copied into a user's workspace and filled in on-demand. The document library would in this case store the document's fillable fields and possible default values in a "Fields" table. In a second circumstance, fields and values unique to each user are applied and mapped to blank documents. This set of unique user information will grow over time into a large vault of information. In a third circumstance, actual fields and values assigned to a document are filled in and saved by the user, such that the values are locked to a completed document. Some techniques for solving these problems are addressed below.

A first solution involves scanning the fields of a document and making associations and inferences as to a "best-fit" field name. In one embodiment, this is completed by utilizing the "for" attribute of a website field code that associates form labels with a field box on the page. For example, a field box with the ambiguous name "box00455x" may be encoded as "label for="firstname," so that we can associate the obscure name and the field with the label for "first name."

For a situation where there are multiple fields in a document or form with the same or similar field names, the section of the document in which each field appears can be used to identify whether the values for each field should be different. The system database may therefore store a "field section" entry as a category in the database for each field, so that fields with the same name can be disambiguated based on which section they are in.

In some cases, a field name may be completely random and provide no indication as to how it maps to another field or a particular field value. The field names may be coded for another system which reads the specific codes with a computer and a specialized numerical or letter key code. For example, a "First Name" field may be named "fn0045586." For PDF documents stored in the document library, an additional "helper" attribute may be added to the field record called "commonFieldName." When the document is inputted, the poorly named field will be manually translated to something that is easily mapped. For this "First Name" example, our database will record the FieldName record as "fn0045586" and the "commonFieldName" as "First Name." When a user selects this document, our smart technology will recognize the commonFieldName and easily map that to one of the user's field names that best matches "First Name."

In a situation where a user has multiple values associated with the same field name, a solution would be to provide a drop-down menu or other selection method where the user can select which value to input into the particular field. In an alternative embodiment, the field is populated with the most recently-used value or the most frequently-used value.

In another circumstance, different forms may have different ways to refer to the same user field name. A document may name a field one way while another document names the same field another way. For example, a first document may have a field named "First Name," while a second document may have a field named "frame," and yet a third document has a field named "firstname"—all of which are referring to the same field and should contain the same value or content. To enable this association, a user FieldDefaults table in the system database is provided with a "userFieldCollections" record that lists the various field names that are synonymous. For example, over time there will be multiple fields stored in the database each containing the same value. For example, assume each of these 3 "first name" fields will all have the value "Arthur." A background process executed by the field comparison unit 106d of FIG. 2 will periodically scan the database for other fields with values of "Arthur" and identify those fields within the "userFieldCollections" table as duplicates. This table captures the various field names that are synonymous based on their common content. When any one of these fields is encountered in subsequent forms, the appropriate value of "Arthur" is used. In a second approach, we will pre-set the "userFieldCollections" table with commonly-grouped field values. For example, "firstname" and "First Name" are stored into the table when the field called "firstname" is initially encountered. When a subsequent field called "First Name" in encountered, its value would have already been stored and easily located through the "userFieldCollections" table.

In one example, a problem occurs when there are commonly labeled field names, for example a field name labeled "myFirstName" and another field (likely in a different form) labeled "customerFirstName." Since these field names clearly correspond to the same information (a user's first name), in order to map "myFirstName" to "customerFirstName," a machine learning classification library is applied to learn from existing mapped fields from other users and then assign a recommended mapping between a user's field and a document's field.

Identity Disassociation

In order to protect the user's information from potential theft and misuse, the system disassociates a user's identifiable information from their other information. For example, the user's name, social security number, birthday, employer identification, etc. is stored in a separate database (or separate database table on the same database) from the user's other information, such as their credit card number, bank accounts, education, grades, etc. The identifiable information is additionally stored without any logical connection to other identifiable information of the same user, such that each identity information field is effectively stored on its own island within the database. Each item of information may furthermore be encrypted individually and then stored in a table anonymously with other information, without any indexing, organization or grouping of the table, so that the table is unable to provide any useful information about a user on its own.

The encrypted information can only be decrypted with a key, and optionally in some cases, the key is individually generated for each separate item of information so that the key cannot be misused to unlock other items. The key is stored in a separate database and may only be obtained when a user logs in with the correct password. Thus, by disassociating the information that makes up the user's identity, it is impossible to determine enough of a user's information to effectuate identity theft simply from accessing the database and the tables listed therein.

As an example, a user's social security number (SSN) stored on its own and apart from other information (such as the user's name) is not useful for perpetuating identity theft. Given that the SSN is further encrypted into an unrecognizable series of letters and numbers, the system provides two highly-secure methods of protecting the information stored in the database. In one embodiment, three separate databases are used to obtain information, and each database may be connected to the network using a separate server, which may be behind a separate firewall. A first database may be configured to store the user's username and password. If successful in entering the username and password, a secret key is generated which will then be supplied to a second database which is solely used to store secret keys for each user. A third database maintains the actual information and must be unlocked with the secret key from the second database in order to be read through an encrypted mapping to re-associate the islands of information.

Automatic User Profile Updates

The system may be configured, in one embodiment, to automatically classify and store any inputted information into the user's profile without requiring a specific indication from the user. Additionally, as user information will continue to be obtained during the user's normal activities, newly-input information will either act to update existing information or be added to a list of values for the same information field that the user can then select from when populating a form.

The user's information may be stored in its own database known as the personal information vault, and therein within a table called "customerFieldDefaults." The customerFieldDefaults table will usually contain the most current information for the user.

Deriving User Information

In one embodiment, existing user profile data may be analyzed to derive additional related information. The additional related information may be derived by performing comparisons or calculations of existing data, such as by analyzing financial data to determine a budget of regular income and expenses. In addition, the additional related information may be derived from external sources in order to provide the user with a more complete picture of certain aspects of their profile. For example, if a user enters a list of assets into their user profile that includes a vehicle year, make and model, the system may obtain an estimated value for the vehicle from an external database or third party service. In another example, if the user enters the title of a collectable piece of artwork, the system may obtain additional information on the art, such as the artist, year produced and an estimated value. This information could be used to fill out an insurance application or a claim for the item in the event of a loss.

Analyzing User Information

In one embodiment, the user activity collection unit 106e of FIG. 2 monitors user activity (such as information inputs, forms filled, etc.) when using the system and generates, collects and stores predetermined descriptive codes, based on their activity and information, into a separate database. The codes may correspond to a user's current life status, demographic profile, preferences, financial balances, and other parameters which are associated with a user's account, but do not collect, disclose, or compromise their specific information. These codes can subsequently be used to determine targeted marketing and other strategies for that user for promoting third-party product and service offerings, which effectively better target their needs and desires for those products or services. The codes may also be provided with a confidence value relating to the likelihood that the code applies to the user based on factors relating to the type of form, the use of other related forms, etc.

For example, a user completing a college application may generate a code that relates to the likelihood that the user is about to enter college, which will then provide opportunities to market college-related products or services to the user. If the user completes a college application and a financial aid application, the confidence value relating to the code indicating that the user is about to enter college may jump higher. This may be used to present an advertisement to the user within the graphical user interface that is targeted to their life status, such as an ad for a college.

Archiving of Populated Information

Each time the user populates information into a form, the system can save the final version of the form within a specific database table known as the customerFieldContent. The information stored in the form can be locked and will not be updated as other user information is updated, unless the user specifically accesses the previously-completed form, edits the form itself and creates a new version. The stored completed forms may be time and date stamped, to create a complete archive of the user's activities within the system. This may be used to present an advertisement to the user within the graphical user interface that is targeted to their life status, such as an ad for a college.

Shared Family Information and Group Plan/Company Plan Information

In one embodiment, the user's information may be shared with other related parties that would like portions of their profiles to be shared. For example, spouses, children, parents, brothers and sisters and other family members may share similar information, such as addresses, telephone numbers, family history, etc. that will also be universally updated if one of the items is changed. This will provide convenience in avoiding entering repetitive information among family members and allow for global updates to shared information and allow family members to collaborate on an application, such as the FAFSA (Free Application for Federal Student Aid). The FAFSA application has certain sections for the Student to complete and other sections that Parents are required to complete. Another example is children applying for college can access shared family information that another sibling has already input into that sibling's user profile, such as addresses, parents' names, occupations, etc. Furthermore, if a family moves, an update to the home address by one family member may be updated or offered for updating across the other family members in the same group who also had an identical home address previously listed. Similarly, various employees of a company could collaborate in order to complete the company's government or other filings or reports; in another example, a database of health records for one generation of a family could be transferred to a second generation to provide information to the second generation about potential genetic health information.

To effectuate the family or company sharing option, information from each family/company member could be stored in a separate vault of the database, and the database would then form links between common information among the family/company members so that each member can maintain the privacy of their separate information.

III. Populating Electronic Forms

Selection of Stored Forms

Figure 9A:
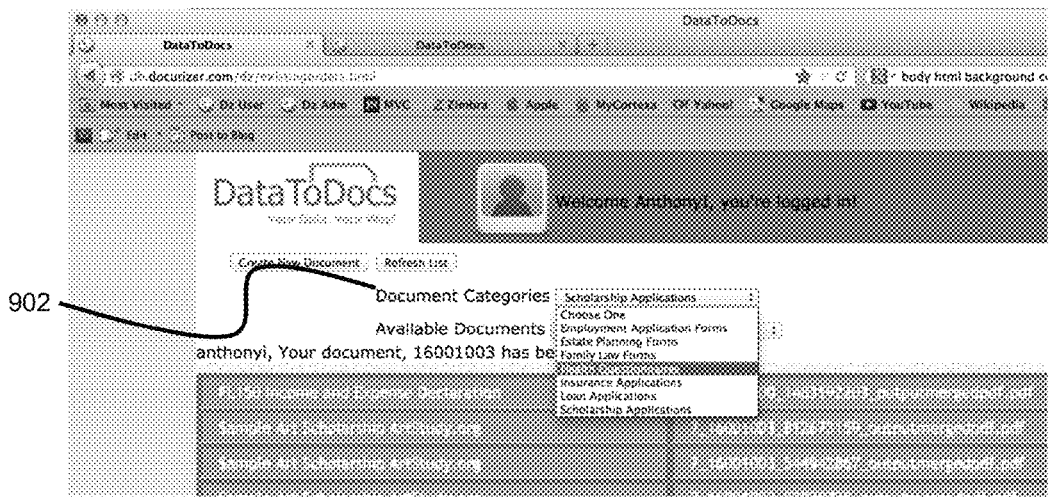
FIG. 9A is a screen shot of a graphical user interface illustrating a web interface for selecting a category of a document for prepopulating user information, according to one embodiment.
Figure 9B:
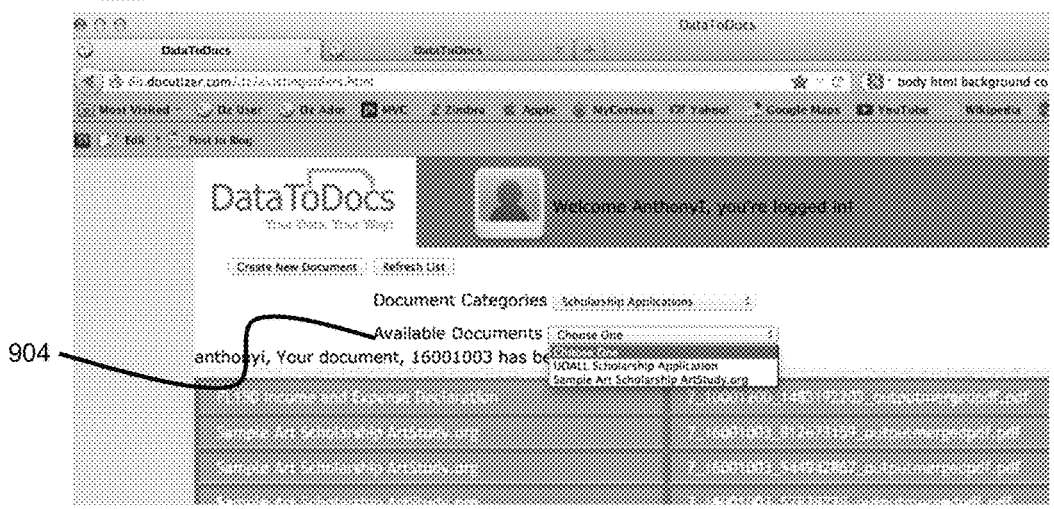
FIG. 9B is a screen shot of a graphical user interface illustrating a web interface for selecting a specific document for prepopulating user information, according to one embodiment.

When the user is ready to complete a form or document, the user can select one of several methods. If the form or document is stored in the forms database at the system server, the user can select the form from a list of document categories 902 or specific documents 904, as illustrated in the attached graphical user interface of a web-based application interface 900 in FIGS. 9A and 9B. In addition, the user may be able to search for the form using a search tool or browse through the categories 902 to find the form based on the type of form (financial, academic, health care, etc.).

Application Extension

In one embodiment, an application extension is provided for quick access to populate a form being viewed in an application window, as shown in the attached illustration of a graphical user interface of a browser extension drop-down menu in FIG. 5. The extension may be displayed as an icon, menu item, supplement or otherwise in the application menus or elsewhere, and upon selection of the icon, a window opens with options to populate information from the user's profile to the fields displayed in the application window. The application may be an Internet browser, a word processor, image viewer, spreadsheet or presentation software, although these examples, as all examples and embodiments herein, are not limited hereto.

In another embodiment, as discussed in Section I, above, an application extension may also be used to extract information from or supplement a form, document or webpage being displayed in an application window. This extracted information can be uploaded to the user's personal information database.

In another embodiment, an application extension may also be used to display, and allow for modification of, user stored contact, CRM and/or contact related information related to form-fields recognized by the system while viewing a third party website such as on LinkedIn™ Facebook™ or Zillow™ websites. In one example of this embodiment, a user is shown a pop-up or drop-down window while viewing one of their LinkedIn™ contact which allows them to view, modify, or directly add unique and private information about that particular contact back into their personal user database, without necessarily sharing that information with LinkedIn™ or the other users of LinkedIn™. Essentially, the user is augmenting the LinkedIn information with the user's personal notes on that contact, and securely storing that information for personal use in their information database. In another example, a user defined as operating a real-estate business is shown a pop-up or drop-down window while viewing a specific listing on Zillow.com™ which allows them to view, modify, or directly add unique and private information about that particular property back into their personal user database. This allows the real-estate business user to collect useful business information (e.g., the list of clients shown a particular property, listing details, showing schedules, etc.) which may enable them to be more effective in their business.

Third-Party Application Integration

A third-party service provider may also incorporate access to the system into their own application, such as a web-based application or a mobile application running on a portable electronic device. For example, a website run by an academic institution may integrate access to the system into their application for applying for admission, such that upon loading the admissions application, the user can log in and then access their information to populate the admissions application directly through the website. In addition, an internet shopping website may integrate access to the system database so that when the user is ready to check out and purchase goods or services from the website, a button, link or authentication dialogue will be available for the user to select and then populate their information onto a payment screen.

The integration with the third-party application may provide additional security to the user, as it may be configured so that the third-party service provider cannot view or store the user's information, and instead only requests it from the system database at checkout and then deletes it once the transaction is complete.

The applications may be offered as standalone products or as web-based products and services. In one embodiment, the application may be offered as a portable document format (PDF) filler application, where the application operates to populate information in a PDF document. The PDF filler may be a web-based application or integrated as a browser extension, as has been previously discussed. The application may also be offered as a web-based form filler that is designed to complete forms and documents found online. Additionally, the system may be offered as a mobile application running on a smartphone, tablet or other portable electronic device that would enable a user to complete forms or other documents. With the difficulty of inputting information using small display screens and touchscreen devices, the ability to easily populate information with a portable electronic device is particularly advantageous. For example, users who are using their mobile device to make a purchase often find it difficult to enter all of their contact information and payment information on a small screen (in addition to having to remember it). The ability to instantly complete these ecommerce form fields will be particularly advantageous to the mobile user. In another example, a user visiting an urgent care or emergency room facility may be required to fill out several forms, and could instead be provided with a website to access the forms and utilize the inventive systems to populate the form fields and submit the form online. The mobile-based applications may be standalone or integrated into other mobile applications or native device applications. For example, in one embodiment, the system may be integrated with the camera of a portable electronic device, such that a user can take a picture of a blank form or document and utilize the system to populate the form fields before transmitting the completed document.

In another embodiment, a third party application may integrate with the system and the user profile to provide a partial or complete transfer of user profile data from the system to a third party user profile without requiring the user to view a form with the fields in the third party user profile. For example, a user who signs up for a third party service such as a social media service or an ecommerce service may be asked to complete a user profile simply by requesting that their user profile generated on the system be transferred to the third party application and corresponding server and database. The user may only need to select an option to instantly transfer all of their user profile information to the third party user profile without needing to view the web-based form corresponding to the user profile. The instant transfer may be completed by having the third party application send a list of field names to the server, which will then access the database tables to identify the value or values corresponding to the matching field names stored in the user profile. The matching field values will then be transferred back to the third party application server and database to complete the third party user profile.

Additional methods of transferring select user profile information automatically to another form, database, device or destination may be provided, and would eliminate the need for the user to manually review the form fields and content as it is being filled in or transferred to another location.

Form Completion Indicator

In one embodiment, the user may be provided with a form completion indicator which indicates how much of a form can be filled from the information in the user profile. The form completion indicator may be displayed alongside a list of possible forms that the user is selecting from, so that the user can determine which form is easiest to populate based on the form completion indicator. The indicator may be a symbol, color or even just a numerical value indicating the percentage of fields in the form which will be filled in from information stored in the user profile. The form completion indicator will be updated in real time and help the user select a form from the forms database or an online web form which is easiest to automatically populate and has few manual entries. The completion indicator may also provide the user with an indication of how much of a given category has been mapped or how much work is required to complete the unfilled fields.

Manual Input Interface

Although the system will populate any field for which it has information, certain fields may have no values or may have multiple values, in which case the field will not be automatically filled. In this situation, the user must take some action in order to populate the field. One embodiment for populating the form fields may be aided by voice, touch, gestures or an input device—or a combination of any of the three. The voice and touch input eliminates the need for any manual typing of any information being input into a form. Voice input may be utilized through a microphone on the computing device, while the touch and gesture inputs may be made through a touchscreen, touchpad, image capture device or motion capture device. The input device includes a mouse, stylus or other peripheral device connected with the computing device which permits a selection to be made on the graphical user interface.

In one embodiment, manual input of a value for a field may be completed by displaying a separate window, such as a pop-up or drop-down menu, with options for values that the user can speak, touch or select with the input device. The interaction may include one or more separate input types, such as touching the field on a touch screen to generate the window and then speaking the name of the desired value from a list of field values. Form input fields may also display windows with tips or annotations associated with the system database to assist users in completing a form. In one embodiment, a touch input on the field will initiate an input via voice, while a "touch and hold" input will initiate the display of the separate window with multiple possible values.

The need for manual input will arise whenever the user profile lacks a value for a field, or even when the system is designed to select a best-fit value from multiple possible values based on one or more criteria. The user may be provided with the option to manually input a value in a particular field if no value exists or in order to override the automatically filled value. For example, a user may list multiple different allergies in their user profile (i.e. eggs, bees and cats) such that a form field labeled "food allergies" may be too specific for the system to determine which value of the listed allergies should be automatically input. The system may use data from previous user entries by other users to determine that "eggs" is the most likely candidate. However, the user will then be provided with the option to select the field to generate the separate window and then select from the list of allergies in order to correct the selection—for example by adding "bees" or "honey" to the list if the user is allergic to food products made by honey. If the user has no field values stored for the field name "allergy," the user may be prompted to manually input a field value with a physical keyboard or touchscreen keyboard interface, through selecting a category to provide a list of options in one or more drill-down menus, or by simply speaking the desired value and letting voice recognition software interpret the voice command and input the appropriate value. The user may also be able to speak a partial keyword for the form field which will then display the separate window with possible values that include the partial keyword. A lookup algorithm may be provided to associate keywords with possible related values.

As previously discussed, one application for a touch and voice input would be the ability to touch a specific form field and then speak the value that should be input into the field. Alternatively, the user can first speak the name of the field if the system cannot identify the field name, which will cause the system to populate the value for the spoken field name from the user profile. If no field value exists for the field name, the user could also then speak the value for the field. If the value entered is a new value, the system will store the value in the user's profile for future use. In one example, a user filling out an automobile insurance claim and needing to enter a vehicle identification number (VIN) may be able to touch the field box labeled "VIN" and then state "VIN number" or a similar command, after which the system database will populate the field with the stored VIN number. In another embodiment, selecting a value to populate in one field may also populate values in related fields. For example, during an eCommerce checkout phase, an on-line merchant prompts the user to input a credit card by displaying a field with such name. The user touches the field on their mobile touch-device and speaks the word "Visa®"

and the user's Visa® card number, name on that card, card expiration date, and card security code (CSV) are all filled into the associated fields on the checkout form. The advantage to the user is that they need not store any personal credit card numbers with any on-line merchants, yet can still experience a speedy and secure shopping checkout. In addition, as user credit cards expire and are replaced or updated, there is no need for the user to remember to visit each merchant site just to update card changes as those are all stored in one location and securely on the system database.

In another embodiment, if a field has multiple possible values, the user may be able to touch or speak the field name and then touch, speak or select with a mouse input one of the list of values that is displayed in a drop-down menu or the like. Similarly, if multiple fields have the same name but are in different sections of a form, the user can speak the name of the section and then the name of the field in order to select a value for the specific field desired. Additional functionality includes the ability to touch or speak a form field and then search for values using keywords.

In addition to gestures, touch and voice inputs, the manual input of field values may also be made through specific types of movements in a device configured with a gyroscope or accelerometer which can detect directional movement and velocity. In one embodiment, a user may be able to shake the device (such as a smartphone or tablet) in order to have the user interface find or populate certain fields. For example, the user can shake the device to populate a blank form, and a more specific gesture such as a vertical tilt will find a particular field name and provide the user with a window and several options for field values to populate into the field name (such as a credit card field name and a list of different credit cards which the user can select from for an electronic transaction).

In another embodiment, if an entire form, or if one or more fields in a form, have not been completely mapped and/or stored in the system, then the user may be able to touch or speak each unmapped field name and then touch or speak one of the list of categories, sub-categories, and specific category database fields to associate with this form field to the database field. The system may also collect and associate multiple user mappings of form fields to database fields using machine intelligence algorithms and then store the associated field mappings with the form into the forms database, thereby providing for an accurately mapped new form for use by all users of the system. This embodiment allows for system users to independently add, and map, new forms that are not currently in the system for the benefit of all system users. Additionally, it allows for system users to independently map web-form-fields to the database category fields for web-forms that have not yet had their fields mapped (associated) in the system for the benefit of all system users.

Storing Modifications

In one embodiment, if the user manually alters a field value for a particular field after the system has populated the field, the system will denote the changed value and store the newly-input value in the system database, preferably in the information vault of the user's profile. The user can therefore update their profiles automatically while changing the information being input into a form.

Methods and Applications

Although several applications for the systems and methods have been described above, the applications for the systems and methods should not be considered limited thereto. The systems and methods may be particularly applied for the completion of complex forms and documents which have a variety of form fields, require a significant amount of information or have similar or confusing names and field identifiers. College applications, loan applications, income and expense declarations for family law matters, health care forms and the many forms required for and by small business owners are potential applications that would provide significant improvements in time savings and accuracy of information (not to mention ease frustration or reduce redundancy) by use of the exemplary systems described herein.

Figure 12:
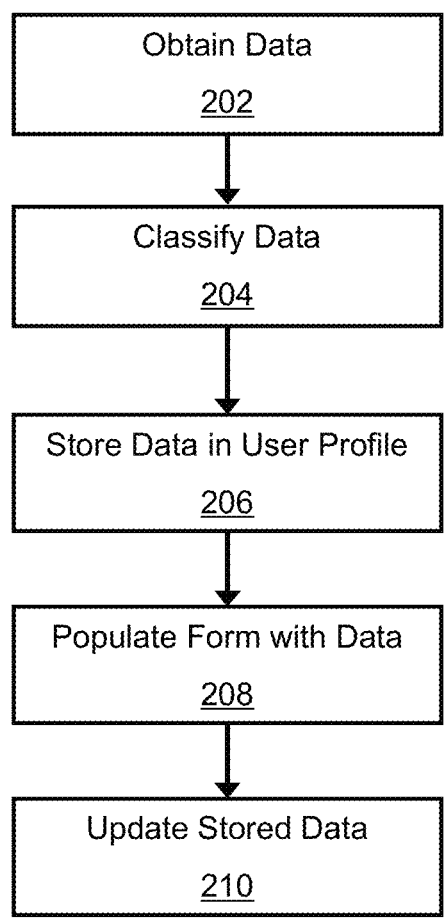
FIG. 12 is a flow chart illustrating a method of obtaining, classifying and populating personal information onto an electronic form, according to one embodiment.

One embodiment of a method of obtaining, classifying and populating electronic forms is illustrated by the flow diagram in FIG. 12. In a first step 202, the information is obtained from one or more sources of information, such as existing forms, third party APIs, etc. The information is then classified in step 204 to determine at least one field to which the information belongs to and to associate the information with the at least one field. The plurality of associated information is then aggregated into a user profile in step 206 and securely stored in one or more databases. When a user requests that a form be completed through one of the client interfaces, the information in the user profile is matched with the form fields on the form and the information is populated onto the form in step 208. In step 210, if the user manually enters values into any form fields, and these values are different from the user's information as currently stored in their secure database, then these new values will be saved into the user's secure database. The user's profile can be optionally updated to reflect the new value as being the default or primary value for the field.

IV. Computer-Implemented Embodiment

Figure 13:
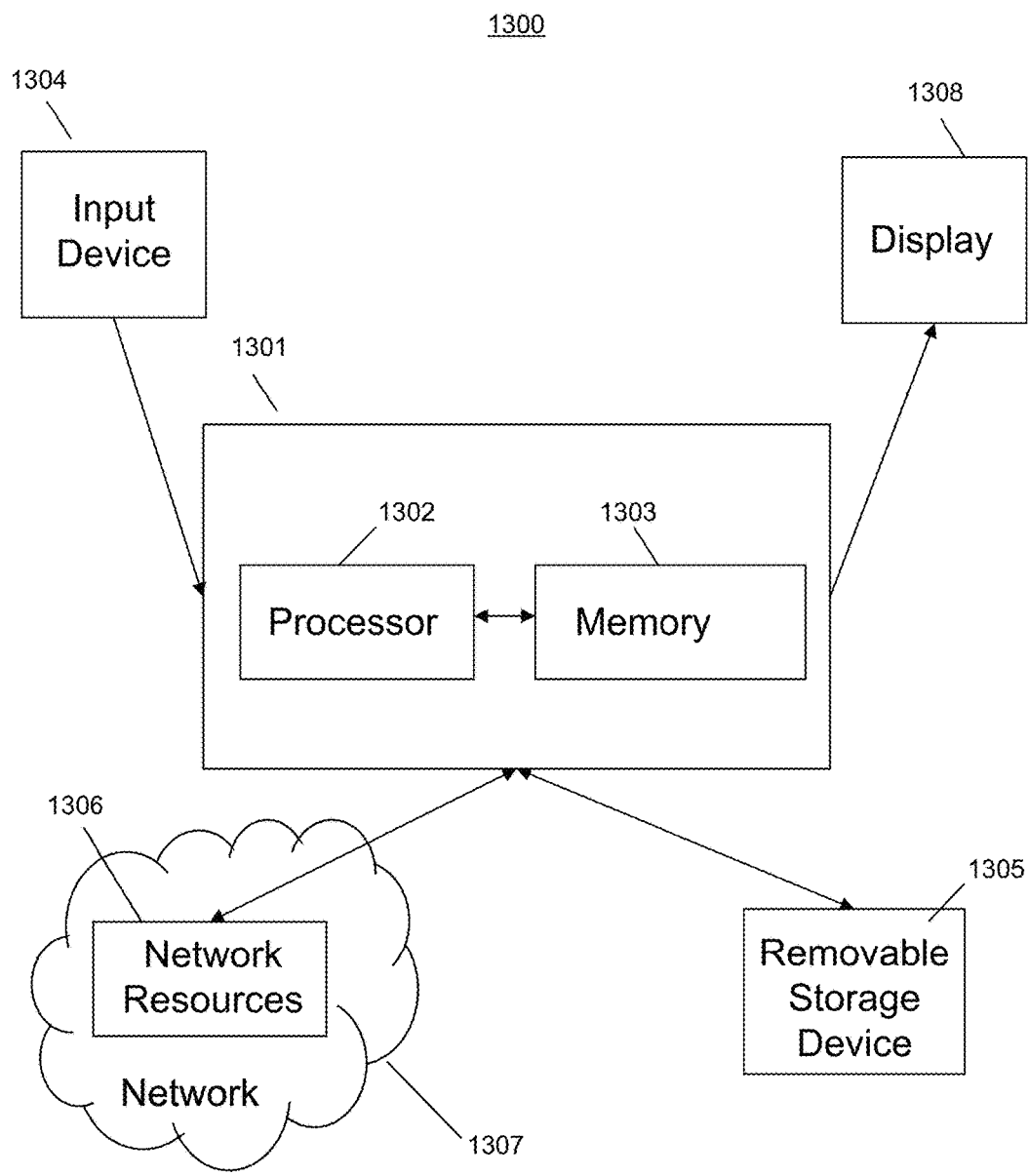
FIG. 13 is a block diagram that illustrates an embodiment of a computer/server system upon which an embodiment of the inventive methodology may be implemented.

FIG. 13 is a block diagram that illustrates an embodiment of a computer/server system 1300 upon which an embodiment of the inventive methodology may be implemented. The system 1300 includes a computer/server platform 1301 including a processor 1302 and memory 1303 which operate to execute instructions, as known to one of skill in the art. The term computer-readable storage medium" as used herein refers to any tangible medium, such as a disk or semiconductor memory, that participates in providing instructions to processor 1302 for execution. Additionally, the computer platform 1301 receives input from a plurality of input devices 1304, such as a keyboard, mouse, touch device or verbal command. The computer platform 1301 may additionally be connected to a removable storage device 1305, such as a portable hard drive, optical media (CD or DVD), disk media or any other tangible medium from which a computer can read executable code. The computer platform may further be connected to network resources 1306 which connect to the Internet or other components of a local public or private network. The network resources 1306 may provide instructions and information to the computer platform from a remote location on a network 1307. The connections to the network resources 1306 may be via wireless protocols, such as the 802.11 standards, Bluetooth® or cellular protocols, or via physical transmission media, such as cables or fiber optics. The network resources may include storage devices for storing information and executable instructions at a location separate from the computer platform 1301. The computer interacts with a display 1308 to output information to a user, as well as to request additional instructions and input from the user. The display 1308 may therefore further act as an input device 1304 for interacting with a user.

While various embodiments have been described above, it should be understood that they have been presented by way of example only, and not of limitation. The breadth and scope should not be limited by any of the above-described exemplary embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A system for populating an electronic form with user information, comprising:
    an input device configured to receive one or more voice inputs;
    a database comprising a plurality of storage locations and configured to store a user profile comprising a plurality of fields in association with a plurality of values;
    at least one hardware processor;
    at least one executable software module that, when executed by the at least one hardware processor, is configured to:
        receive, via the input device, a first input that identifies a first field included in the electronic form;
        identify a group of synonymous fields of the plurality of fields of the user profile based on the identified first field and corresponding to a subset of values of the plurality of values;
        identify the subset of values as corresponding to the first field;
        receive, via the input device, a second input selecting a first value included in the subset of values for the first field;
        populate the first field of the electronic form with the first value; and
        derive additional information related to at least one of the subset of values that correspond to the first field based on calculations performed, by the at least one executable software module, on information obtained by the at least one executable software module from third party sources,
    wherein the group of synonymous fields is identified at least in part by performing comparisons of values inputted by a user corresponding to a plurality of different fields previously obtained by the software module from a plurality of different sources and associating the fields of the plurality different fields having common values;
    wherein the field category is identified at least in part by learning from existing mapped fields from other users to identify fields to which the information is applicable,
    wherein the subset of values is automatically identified when the user selects the electronic form from a plurality of other electronic forms, and
    wherein the at least one executable software module is further configured to:
        dissociate the subset of values of the user profile from other values of the plurality of values of a user profile,
        disassemble the subset of values into a plurality of separate pieces of information,
        individually encrypt each of the plurality of separate pieces of information comprising the subset of values using a separate encryption key for each of the separate pieces of information, and
        distribute each of the plurality of individually encrypted pieces of information among the plurality of storage locations.

2. The system of claim 1, wherein the at least one executable software module is further configured to populate a second field of the electronic form with a second value based at least in part on a correspondence between at least one of the first field and the first value and at least one of the second field and the second value.

3. The system of claim 1, wherein the second input comprises a voice input.

4. The system of claim 1, wherein the input device is further configured to receive one or more tactile input and the second input comprises a tactile input.

5. The system of claim 1, wherein the plurality of values corresponding to the plurality of fields comprises user information that includes user identifiable information and other information, wherein the subset of values corresponding to the first field comprises identifiable information.

6. The system of claim 1, wherein the at least one executable software module is further configured to:
    retrieve the each of the plurality of individually encrypted pieces of information from the plurality of storage locations, and
    decrypt each of the plurality of individually encrypted pieces of information using a separate decryption key for each of the plurality of individually encrypted pieces of information to identify the subset of values.

7. The system of claim 1, wherein the at least one executable software module is further configured to:
    generate a user interface window displaying the subset of values corresponding to the first field.

8. The system of claim 7, wherein the at least one executable software module is configured to identify at least one of the subset of values based at least in part on the stored user profile associating the first field to the at least one of the subset of values.

9. The system of claim 8, wherein the at least one executable software module is further configured to update the stored user profile based at least in part on a correspondence between the first field and the first value.

10. The system of claim 9, wherein updating the stored user profile includes storing the selected first value as a default value of the subset of values for the first field.

11. The system of claim 1, wherein each of the plurality of different fields comprises an associated field name, and the software module is further configured to scan the plurality of different fields to identify the fields having common values and create an association between the associated field names of the fields having common values.

12. The system of claim 11, wherein, when any one of the fields names associated with the fields having common values is identified via the first input, the common value is identified as part of the plurality of values for the first field.

13. A method of populating an electronic form with user information, comprising:
    storing, in a database, a user profile comprising a plurality of fields in association with a plurality of values, the database comprising a plurality of storage locations;
    dissociating a subset of values of the user profile from other values of the plurality of values of a user profile;
    disassembling the subset of values into a plurality of separate pieces of information;
    individually encrypting each of the plurality of separate pieces of information comprising the subset of values using a separate encryption key for each of the separate pieces of information;
    distributing each of the plurality of individually encrypted pieces of information among the plurality of storage locations;
    receiving, from an input device configured to receive one or more voice inputs, a first input that identifies a first field included in the electronic form;
    identifying a group of synonymous fields of the plurality of fields included in the user profile based on the identified first field and corresponding to the subset of values of a plurality of values;
    identifying the subset of values as corresponding to the first field;
    receiving, via the input device, a second input selecting a first value included in the subset of values for the first field;
    populating the first field of the electronic form with the first value; and
    deriving additional information related to at least one of the subset of values that correspond to the first field based on calculations performed, by the at least one executable software module, on information obtained by the at least one executable software module from third party sources,
    wherein the group of synonymous fields is identified at least in part by performing comparisons of values inputted by a user corresponding to a plurality of different fields previously obtained by the software module from a plurality of different sources and associating the fields of the plurality different fields having common values;
    wherein the group of synonymous fields is identified at least in part by learning from existing mapped fields from other users to identify fields to which the information is applicable, and
    wherein the plurality of values is automatically identified when the user selects the electronic form from a plurality of other electronic forms.

14. The method of claim 13, further comprising populating a second field of the electronic form with a second value based at least in part on a correspondence between at least one of the first field and the first value and at least one of the second field and the second value.

15. The method of claim 13, wherein the second input comprises a voice input.

16. The method of claim 13, wherein the input device is further configured to receive one or more tactile inputs and the second input comprises a tactile input.

17. The method of claim 13, further comprising:
    generating a user interface window displaying the subset of values corresponding to the first field.

18. The method of claim 17, wherein at least one of the subset of values is identified based at least in part on the stored user profile associating the first field to the at least one of the subset of values.

19. The method of claim 18, further comprising updating the stored user profile based at least in part on a correspondence between the first field and the first value.

20. The method of claim 19, wherein updating the stored user profile includes storing the selected first value as a default value of the subset of values for the first field.

* * * * *